United States Patent
Kneer et al.

(10) Patent No.: US 11,975,925 B2
(45) Date of Patent: May 7, 2024

(54) GENERATION OF LAMINATED PRINTED SENSOR LOOP STACK

(71) Applicant: ContiTech AG, Hannover (DE)

(72) Inventors: Janosch Kneer, Freiburg (DE); Juerg Schleuniger, Hartheim (DE); Isabell Kegel, Freiburg (DE); Andrey Minkin, Adelebsen (DE); Sebastian Seibold, Hann. Muenden (DE); Stavros Podias, Goettingen (DE); Christel Bäuerle-Müller, Hann. Muenden (DE)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 17/934,556

(22) Filed: Sep. 22, 2022

(65) Prior Publication Data

US 2024/0101357 A1 Mar. 28, 2024

(51) Int. Cl.
*B65G 43/02* (2006.01)
*B65G 15/32* (2006.01)

(52) U.S. Cl.
CPC ............ *B65G 43/02* (2013.01); *B65G 15/32* (2013.01); *B65G 2203/0275* (2013.01); *B65G 2203/043* (2013.01); *B65G 2207/48* (2013.01)

(58) Field of Classification Search
CPC ......... B65G 43/02; B65G 43/06; B65G 15/32
USPC ..................................... 198/810.02
See application file for complete search history.

(56) References Cited

U.S. PATENT DOCUMENTS

| | | | |
|---|---|---|---|
| 4,854,446 A | * | 8/1989 | Strader ............... B65G 43/02 340/676 |
| 7,810,634 B2 | | 10/2010 | Wallace et al. |
| 8,069,975 B2 | * | 12/2011 | Wallace ............... B65G 45/02 198/810.02 |
| 8,177,051 B2 | | 5/2012 | Alport et al. |
| 8,256,607 B2 | | 9/2012 | Wallace et al. |
| 8,436,607 B2 | | 5/2013 | Alport et al. |
| 9,199,800 B2 | | 12/2015 | Alport et al. |
| 9,359,147 B2 | | 6/2016 | Wallace et al. |
| 9,702,853 B2 | | 7/2017 | Wallace et al. |
| 9,815,634 B1 | | 11/2017 | Wallace et al. |

(Continued)

FOREIGN PATENT DOCUMENTS

| | | | |
|---|---|---|---|
| DE | 19601899 C1 | 3/1997 | |
| EP | 3995418 | * 5/2022 | ............. B65G 43/02 |
| WO | 2010033526 | * 3/2010 | ............. B65G 43/02 |

OTHER PUBLICATIONS

International Search Report dated Jan. 2, 2024 of International Application PCT/EP2023/075961 claiming priority this application.

*Primary Examiner* — James R Bidwell

(74) *Attorney, Agent, or Firm* — Gregory J. Adamsn; Richard A. Wolf

(57) ABSTRACT

A system (200) for monitoring conveyor belts is disclosed. The system (200) includes a sensor loop stack (110), RFID, a transmitter (104), a detector (106), RFID-readers and circuitry (108). The sensor loop stack incorporated and/or installed (inserted) into a conveyor belt (102). The transmitter (110) is configured to generate an electromagnetic field. The detector (106) is configured to measure an induced electric field from the sensor loop stack (110). The circuitry (108) is configured to detect damage of the conveyor belt based on the measured induced electromagnetic field.

17 Claims, 9 Drawing Sheets

(56) References Cited

U.S. PATENT DOCUMENTS

| | | | |
|---|---|---|---|
| 9,833,802 B2 | 12/2017 | Kalistaja et al. | |
| 10,420,210 B2 | 9/2019 | Uprety et al. | |
| 2004/0149049 A1* | 8/2004 | Kuzik | B65G 43/02 73/862.453 |
| 2006/0022815 A1* | 2/2006 | Fischer | G06K 7/10356 340/505 |
| 2006/0273911 A1 | 12/2006 | Nakagawa | |
| 2007/0102264 A1* | 5/2007 | Wallace | B65G 43/02 198/618 |
| 2007/0278068 A1* | 12/2007 | Wallace | G01M 13/023 340/676 |
| 2008/0257692 A1* | 10/2008 | Wallace | B65G 43/02 198/810.02 |
| 2012/0110843 A1 | 5/2012 | Tombs et al. | |
| 2012/0175422 A1 | 7/2012 | Zambon | |
| 2013/0207848 A1 | 8/2013 | Epp et al. | |
| 2019/0144209 A1* | 5/2019 | Happe | B65G 43/02 198/810.02 |
| 2020/0383250 A1 | 12/2020 | Knox et al. | |

\* cited by examiner

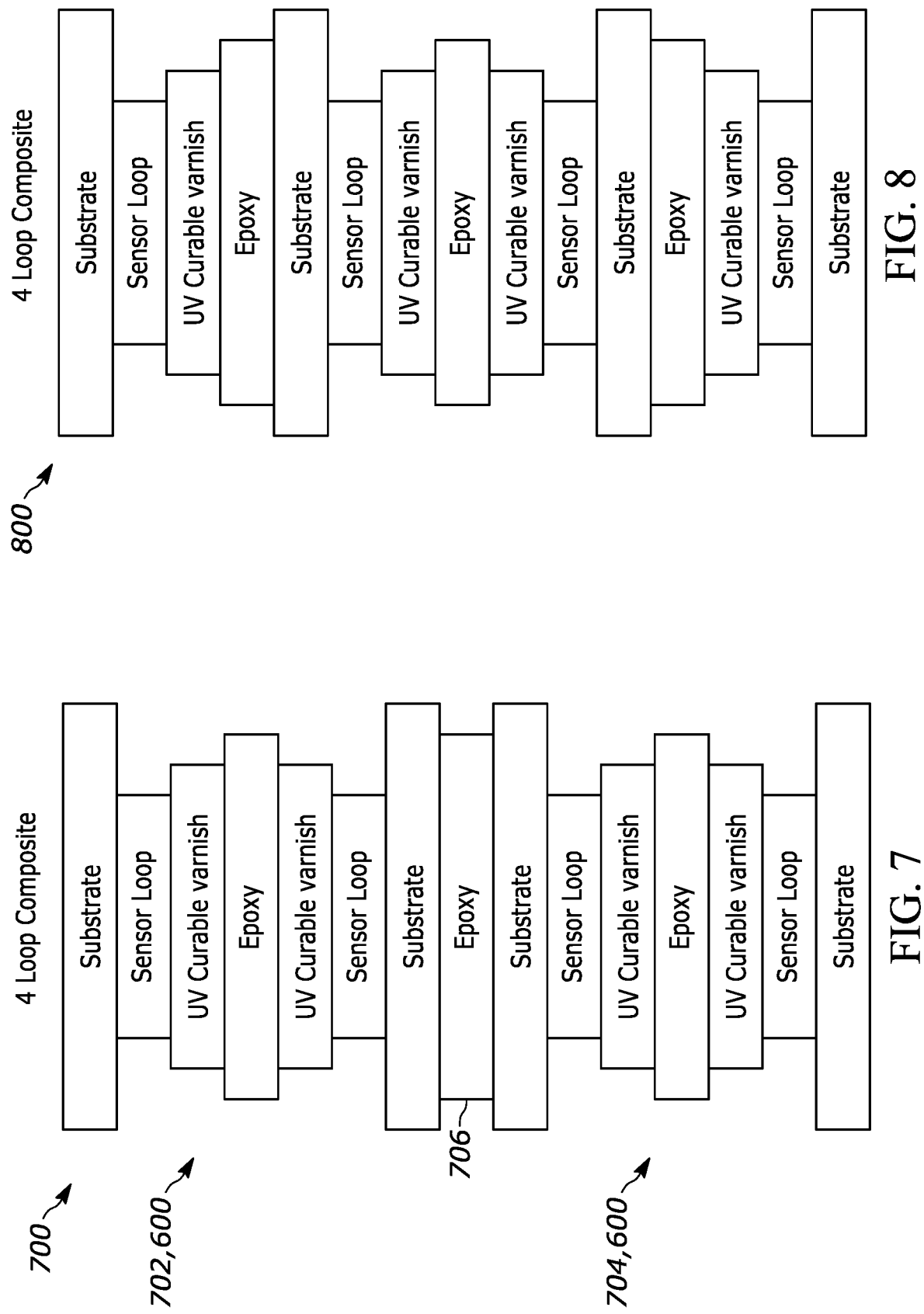

GENERATION OF LAMINATED PRINTED SENSOR LOOP STACK

FIELD

The field to which the disclosure generally relates is rubber and thermoplastic elastomers (TPE) based products, such as conveyor belts, and in particular sensors for monitoring belt and rubber containing products.

BACKGROUND

Conveyor belts are often used to convey material from one location to another and commonly contain covers made of a rubber, PVC, TPE (e.g., TPU, TPV) and other materials, which protect a tension member inside. The conveyor belt can be an endless design and loop about a plurality of drives and/or wheels.

It is appreciated that antennas can be embedded into conveyor belts for the purpose of detecting damage to the belt. The antennas are typically oriented to run across the conveyor belt transverse to the longitudinal direction of the belt and the direction of travel of the belt. A transversely aligned transmitter head and receiver head at a specified separation in accordance with the belt width, with a transmitter for generating an electromagnetic field that induces a current in the antenna and a detector for detecting the electrical field generated by the induced current in the antenna are disposed together at a longitudinal position of the conveyor belt system.

Typically, the antennas comprise wire loops that are embedded into the top (carry) cover or bottom (pulley) cover of the conveyor belt. These wire loops have relatively large thickness profiles that require minimum cover thicknesses to be embedded into. Additionally, the wires are smaller than the longitudinal reinforcing cables which can be damaged during operation and, hence, these wires can also be easily damaged. Given that these wires need to maintain a conductive loop, a break in the loop wire often leads to the loop to be no longer be efficient at coupling the transmitted radio frequency signal across the width of the belt and this can lead to the loop not being detected by the receiving detector.

One or more techniques are needed to provide improved antenna loops for conveyor belts.

BRIEF DESCRIPTION OF THE DRAWINGS

FIG. 7 is a diagram illustrating yet another loop stack 700, 110 for use as a printed belt antenna in the system 100 in accordance with one or more embodiments.

FIG. 8 is a diagram illustrating another loop stack 800, 110 for use as a printed belt antenna in the system 100 in accordance with one or more embodiments.

DETAILED DESCRIPTION

Figure 1:
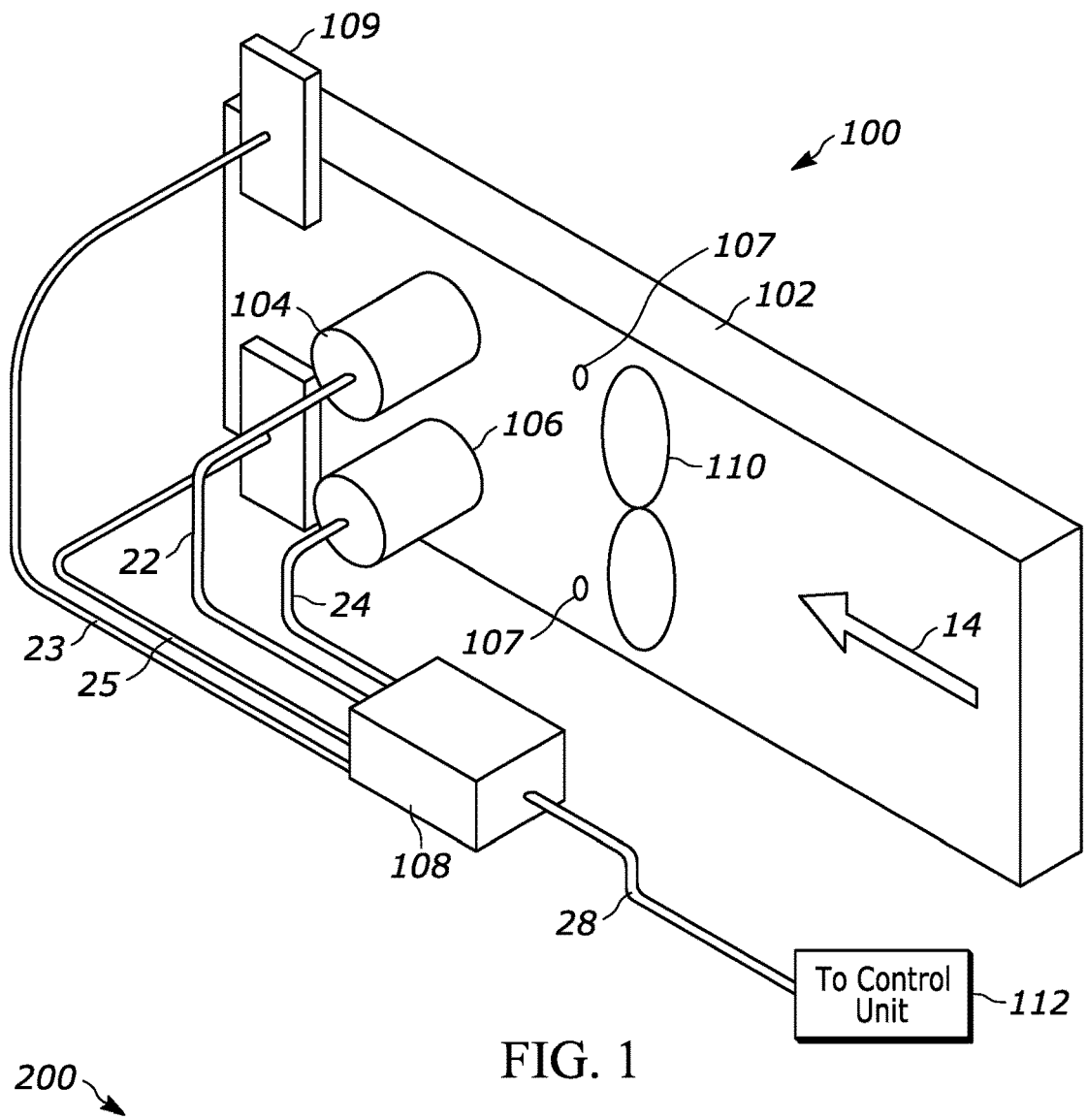
FIG. 1 shows an example of a conveyor belt system 100 configured in an endless loop or belt. It contains an endless conveyor belt 102 moving in the direction showed by 14, and embedded into a belt antenna (also known as a "sensor" or "sensor loop") 110 and RFID 107, a belt monitoring system (22, 23, 24, 25, 28, 104, 106, 108, 109) connected to a control unit 112 of a conveyor system

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that inductive sensor loops, referred to as antennas can be used for rip detection in conveyor belts.

These loops typically involve two categories, a non-inverting rectangular loop design and an inverting figure '8' design. The FIG. 8 design has loops to mitigate crosstalk between transmitter and detector components. The loops are spaced along the conveyor belt length and the functionality of the loops are monitored by the detector heads, which monitor the amount of signal that is coupled through the width of the conveyor belt via the inductive antenna loops.

A common issue with the inductive sensor loops is that their functionality is dependent on the transmission of a radio frequency (RF) induced signal through the loop. This signal cannot be coupled across the conveyor's width if there is a break in the wire. This is the key to its functionality, but also a weakness to its functionality. Often the loop wire can be damaged by events other than a longitudinal rip and for this reason the systems can produce what is referred to as nuisance alarms that can cause the conveyance process to come to a stop as the system logic is stopping the belt to limit the damage associated with a damaged antenna.

Inductive loops typically rely on sensor wires to be embedded in the conveyor belt covers to form an inductive antenna element that is detected by inductively coupling to an rf detection circuit, often referred to as detectors. These wire based inductive antennas have a defined thickness gauge and this gauge can force the pulley cover to be larger than it would otherwise be for a specific application. This can add cost and/or eliminate use of these sensors in applications due to physical gauge of the antenna.

An issue associated with inductive sensors relates to the inductive antenna's dependence on conducting or coupling of an RF signal. This requires the conductive element to be continuous and capable of carrying the signal being transmitted. As a result, any damage to the wire will negatively affect the performance of the antenna. In loop antennas, this issue sometimes is overcome through the use of nested or redundant loops within the antenna design in an effort to manage the risk associated with these failures. Unfortunately, an event that would damage one of the antenna conductive elements often impacts the adjacent redundant element as it is in close special proximity to the first element.

It is appreciated that sensor loop antennas are generality made of wire which is manually crimped, embedded and covered up resulting in a mat which is further integrated and embedded into rubber belts by opening/re-working the belt at the desired spot an under usage of certain primer materials, heat and pressure.

This typical manufacturing process requires multiple steps, a manual manufacturing process, and is costly and time consuming. In this regard, the manual assembly process also does not allow for much flexibility in designing, tailoring or improving the inductive antenna type and layout, such as adding additional loops or nesting of loops is proportionally increasing the effort and thus the fabrication cost.

The assembled mat of wire sensor loops are bulky in that they consume a certain height and stiffness and result in spots in the conveyor belt, where they have been re-worked and integrated that are inherently prone for failure.

A printed sensor loop stack instead of wire based sensor loops can overcome the above deficiencies and the like.

Integrating the printed sensor loop stack into a conveyor belt can consider several guidelines, as shown below:

(1) Safeguarding and prevent deterioration of the printed electrically conductive sensor loop, e.g. protect towards scratches, delamination or degradation of electrically conductive properties due to impurities or surface reactions.

(2) Achieve a given retention force, i.e. achieve necessary adhesion between the used layer materials.

(3) Take into account the outer interface symmetry, i.e. both top and bottom outer side of the sensor loop stack have to be equal to embed into the conveyor belt. Furthermore this interface should adhere with certain palette of adhesive primers (bonding rubbers, TPE-adhesives) used in rubber or TPE-conveyor belts (4) The assembled laminated printed sensor loop, i.e. the material system built-up has to withstand and work with the further belt manufacturing process, especially the vulcanization or other heat or pressure impacts.

One or more embodiments are provided that incorporate a sensor loop stack as sensor loops for rip detection in conveyor belts and the like.

They provide effective, functional assembly and component functionality.

PET and TPE (e.g. TPU, TPV etc.) can be used as a favorable substrate in terms of the functional electrically conductive line, i.e. made of conductive silver particles. However it is appreciated that other suitable materials can be used for a substrate.

A dielectric layer is protecting the electrically conductive conducting line and promoting inner adhesion between PET or TPE sheets.

PET and TPE sheets in turn are convenient interfaces for the bonding layer and outer adhesion promotion.

Lower cost of manufacture and easy automated fabrication

Independent of design complexity, favoring tailoring or customization

Lower dimensional cross section, lower stiffness. Leaner integration. Potential to reduce mechanical weakness at integration spots.

Ability to apply in-line with belt production processes (improved responsiveness and less impact to production efficiencies (i.e. less downtime due to sensor integration.

For the mentioned safeguarding of the electrically conductive loop, a UV curable varnish can be used whereas UV linkage and hardening is performed after the upper substrate (PET or TPE) layer is placed and thus fulfilling (1) the safeguarding and protection and at the same time (2) a necessary adhesion between the upper and lower substrate (PET or TPE), whereat the upper PET or TPE (3) provides an outer interface symmetry and establishes suitable adhesion to the conveyor belt (e.g., rubber belt). It is appreciated from investigations that a bi-layer of silver as printed electrically conductive loop material and UV does not sufficiently work with rubber primers and not adheres to the rubber.

Thus, the mentioned layer set-up in combination with the assembly process is fulfilling mentioned demands After embedding and vulcanization (PET) or a lamination (TPE) the printed sensor loop is still functioning in terms of electromagnetic coupling, i.e. inducing and receiving/detection an AC signal as sensing signal.

The one or more embodiments include an example of a suitable workflow of the assembly:

Preparation of PET or TPE sheet of desired size—Printing of sensor loop using electrically conductive ink—Thermal curing of printed sensor loop—Printing of UV varnish—aligned laying of second/upper PET or TPE sheet—adding small cuts in upper PET or TPE sheet to prevent air entrapment/bubbles (optional)—laminating the assembled stack with roller—UV curing of stack to obtain adhesion.

It is appreciated that some applications, such as those that encounter functional, electric layers and demand symmetry of that functional layer to integrate, i.e. may require both-sided equal outer interfaces of PET or similar (e.g., TPE) sheet substrate materials, where functional dielectric layers secure protection and adhesion at the same time.

FIG. 1 shows an example of a conveyor belt system 100 configured in an endless loop or belt.

A transmitter array 104 is positioned on one side of a conveyor belt 102 and a detector array is positioned on another side of the belt 102.

The conveyor belt 102 comprises an elastomeric material, including but not limited to, rubber, TPE and materials that exhibit elastic and rubber like properties.

Printed sensor loop stacks 110 are embedded in the belt 102 for the purpose of detecting damage to the belt. The loop stacks 110 can also referred to as loops or antennas. The stacks 110 are oriented to run across the conveyor belt 102 transverse to the longitudinal direction of the belt and a direction of travel.

The belt can also include tags 107 such as radio frequency identification (RFID) tags. The tags 107 typically include a transponder.

The loop stacks 110 are subject to an electromagnetic field generated by the transmitter 104 and generate an electric field, which is detected by the detector 106.

A belt monitoring system 200 is part of the system 100 and monitors the conveyor belt 102 and is configured to detect longitudinal rips in a conveyor belt. The system 200 can determine whether the conveyor belt 102 has sustained damage while the conveyor belt is advancing through the conveyor system 100. The belt monitoring system 200 generally includes the transmitter array 104, circuitry 108, detector(s) 106, tag/RFID reader 109 and utilize the loop stacks 110.

The conveyor belt 102 has a width in a transverse direction.

The transmitter 104 is configured to generate an electromagnetic field in the antenna and the detector 106 is configured to detect the electrical field generated or induced in the antenna by the transmitter, which are disposed together at a longitudinal position of the conveyor belt system such that the detector and transmitter are adjacent to each other at a spaced relationship with respect to the transverse direction of the belt.

Control circuitry 108 is connected to the transmitter 104 via wired/wireless connections 22,24 in one example. Similarly, the circuitry 108 is connected to the detector 106 via one or more wired/wireless connections. The circuitry 108 is configured to control generation of the electromagnetic field and to process and/or analyze the detected electrical field from the detector 106. The circuitry 108 is configured to detect the presence of damage and/or rips in the conveyor belt 102. The control circuitry 108 can comprise one or more processors, a memory, a network interface and the like. The control circuitry 108 can be connected to a control unit 112 of a belt conveyor and/or the like via a wired/wires connection 28.

The control circuitry 108 can include/incorporate the tag reader 109, such as an RFID reader, configured to read the tags 107. The tag reader generally includes a transceiver and an antenna.

Although RFID is disclosed for illustrative purposes, it is appreciated that other tag based systems, such as near field communications (NFC), bluetooth low energy (BLE) and the like can be used.

Figure 2:
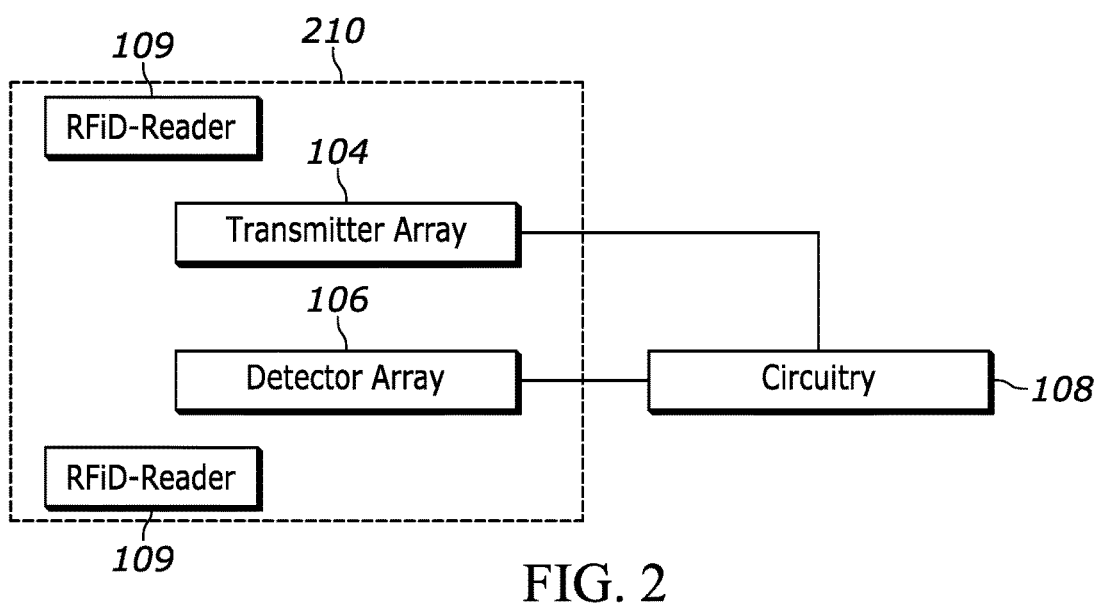
FIG. 2 is a diagram illustrating a schematic view 200 of the belt monitoring system in accordance with one or more embodiments.

FIG. 2 is a diagram illustrating a schematic view 200 of the belt monitoring system integrated into a conveyor belt system 100 in accordance with one or more embodiments.

The transmitter 104 and the detector (or receiver) 106 can be collectively referred to as detector heads 210 and are coupled to the control circuitry 108.

As described above, the loop stacks 110 are embedded in the belt are utilized in the system 100.

Figure 3:
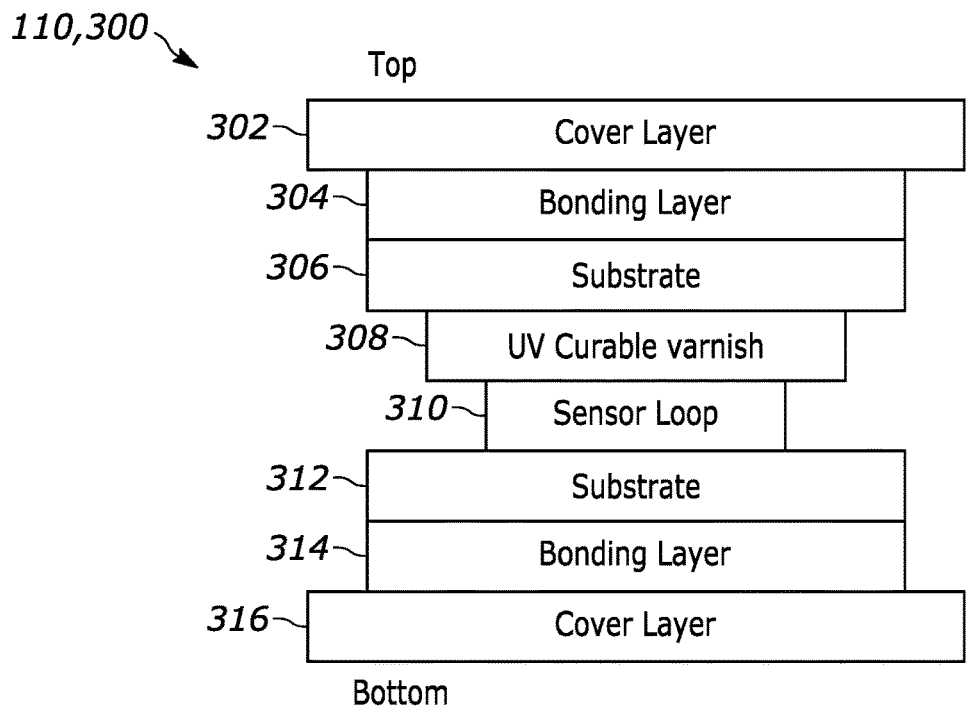
FIG. 3 is a diagram illustrating a loop stack 300, 110 for use as a printed belt antenna in the system 100 in accordance with one or more embodiments.

FIG. 3 is a diagram illustrating a loop stack 300, 110 for use as a printed antenna in the system 100 in accordance with one or more embodiments. The loop stack 300 is provided for illustrative purposes and it is appreciated that suitable variations are contemplated.

The below loop stacks may be shown without reinforcement for illustrative purposes. However, it is appreciated that reinforcements, such as steel cords and/or fabric plies, may be present.

The stack 300 includes a sensor loop 310 printed on a substrate 312. The loop 310 comprises an electric current inducible material, such as silver and the like.

The substrate 312 (lower substrate) is comprised of a suitable substrate material. Examples of suitable substrate materials include Polyethylene terephthalate (PET), thermoplastic elastomers (TPE), which include, but not limited thermoplastic polyurethane (TPU), thermoplastic vulcanizates (TPV) and the like. In one example, the substrate material is a PET material for use with rubber conveyor belts. In another example, the substrate material is TPE for TPE conveyor belts.

The loop 310 is covered with a protective layer 308, such as a ultraviolet (UV) curable varnish and/or the like.

An upper substrate 306 is formed over the protective layer 308 and is comprised of the suitable substrate material.

The loop 310 can be cured by a suitable process, such as a thermal process. Cuts and/or gaps can be formed in the upper substrate 306 to mitigate air entrapment, bubbles and the like.

An upper bonding layer 304 is formed on the upper substrate 306 and a lower bonding layer 314 is formed on the lower substrate. The bonding layers 304, 314 are comprised of a suitable bonding material. For rubber-belts, the bonding material can be made of a Scimm (Bonding) Rubber. In case of TPE-belts the bonding layer can also be made of adhesive films (e.g., TPU-hotmelt films etc.), of TPE-adhesive powders, a liquid one-or two components, moisture curing reactive adhesives (e.g. 1 K-PU), and/or the like.

An upper (top) cover layer 302 is formed on the bonding layer 304 and a lower cover (bottom) layer 316 is formed on the bonding layer 314.

In one example, the assembled stack 300, 110 is rolled and UV cured after assembly to facilitate adhesion.

Figure 4:
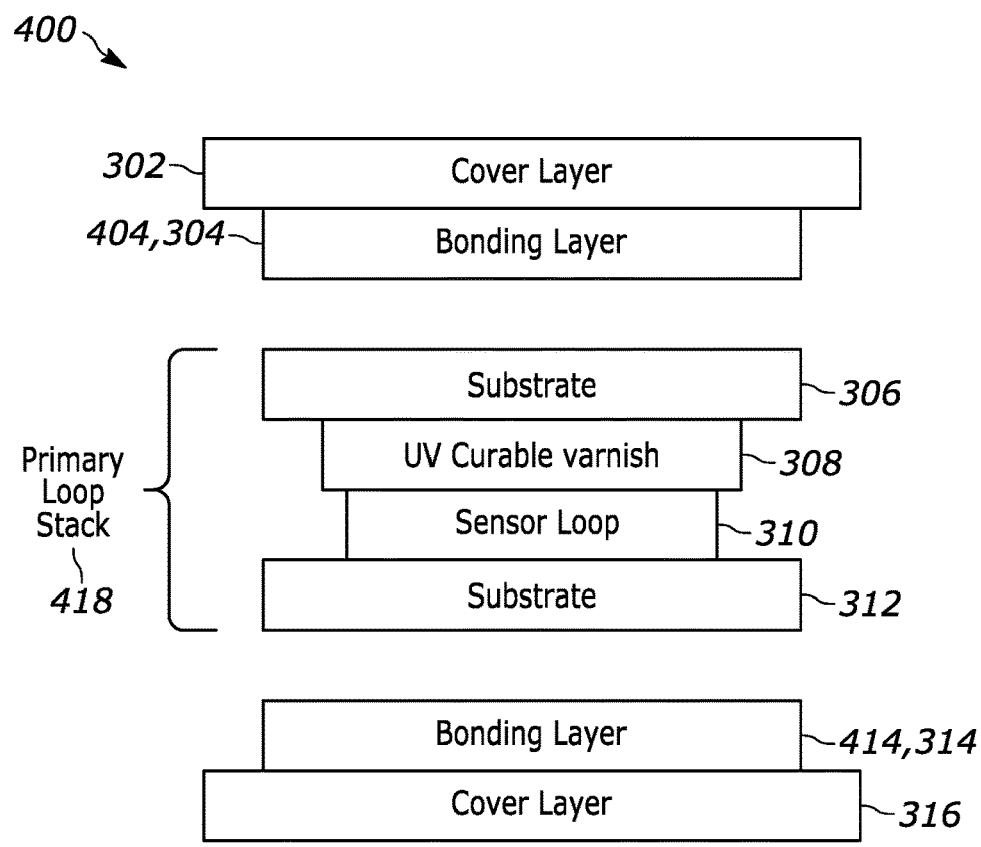
FIG. 4 is a diagram illustrating a loop stack 400, 110 for use as a printed belt antenna in the system 100 in accordance with one or more embodiments.

FIG. 4 is a diagram illustrating a loop stack 400, 110 for use as a printed antenna in the system 100 in accordance with one or more embodiments. The loop stack 400 is provided for illustrative purposes and it is appreciated that suitable variations are contemplated.

The loop stack 400 is similar to the stack 300.

Here, the stack 400 includes a primary loop stack 418 that includes the upper substrate 306, the protective layer 308, the loop 310 and the lower substrate 312.

The upper substrate 306 has a thickness typical of foils in the range of 10 to 250 micrometers, the protective layer 308 has a thickness of 1 to 20 micrometers, the printed loop has a thickness of 100 nanometers to 20 micrometers and the lower substrate 312 has a thickness typical of foils in the range of 10 to 250 μm.

It is appreciated that other suitable dimensions are contemplated.

Figure 5:
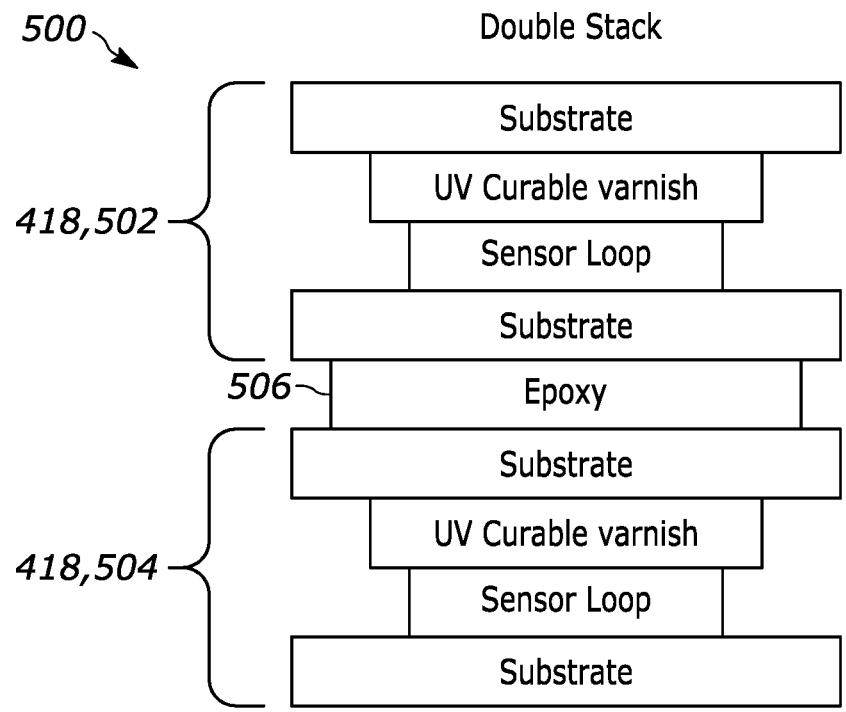
FIG. 5 is a diagram illustrating a loop stack 500, 110 for use as a printed belt antenna in the system 100 in accordance with one or more embodiments.

FIG. 5 is a diagram illustrating a loop stack 500, 110 for use as a printed antenna in the system 100 in accordance with one or more embodiments. The loop stack 500 is provided for illustrative purposes and it is appreciated that suitable variations are contemplated.

The stack 500 is a double loop stack and includes a first stack 502 and a second stack 504.

An epoxy layer 506 binds the lower substrate of the first stack 502 to an upper substrate of the second stack.

It is appreciated that the loop stack 500 can be extended to other suitable examples, such as a four-fold full primary stack.

Figure 6:
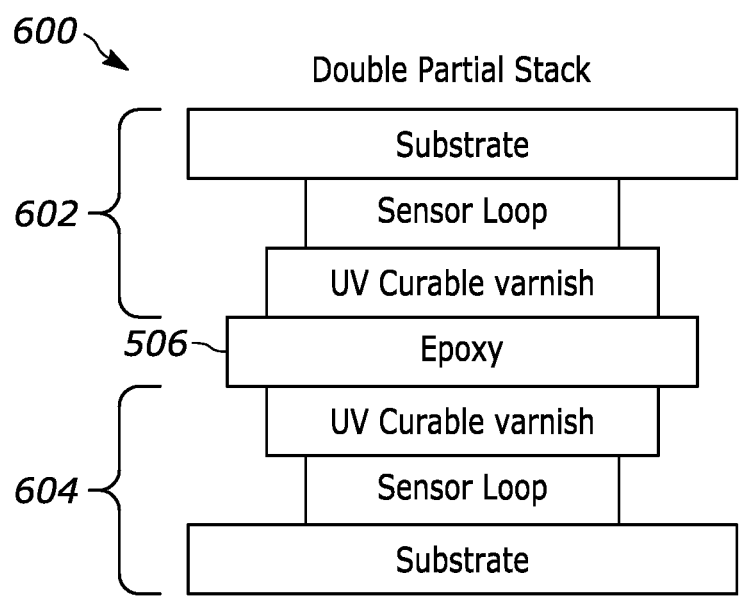
FIG. 6 is a diagram illustrating another loop stack 600, 110 for use as a printed belt antenna in the system 100 in accordance with one or more embodiments.

FIG. 6 is a diagram illustrating another loop stack 600, 110 for use as a printed antenna in the system 100 in accordance with one or more embodiments. The loop stack 600 is provided for illustrative purposes and it is appreciated that suitable variations are contemplated.

The loop stack 600 is similar to the stack 500 and includes a first stack 602 and a second stack 604 bound by the epoxy layer 506.

However, a lower substrate of the first stack 602 and an upper substrate of the second stack 604 are omitted.

The result is a more compact double stack.

FIG. 7 is a diagram illustrating yet another loop stack 700, 110 for use as a printed antenna in the system 100 in accordance with one or more embodiments. The loop stack 700 is provided for illustrative purposes and it is appreciated that suitable variations are contemplated.

The composite stack 700 includes 4 loops and comprises a first double stack 702, 600 and a second double stack 704, 600. The double stacks 702,704 are based on the double stack 600 shown in FIG. 6.

An epoxy layer 706 binds or attaches the first double stack 702 and the second double stack 704.

FIG. 8 is a diagram illustrating another loop stack 800, 110 for use as a printed antenna in the system 100 in accordance with one or more embodiments. The loop stack 800 is provided for illustrative purposes and it is appreciated that suitable variations are contemplated.

The stack 800 is also a composite stack having 4 loops and comprising first and second double stacks.

The double stacks have a first sensor loop printed on an upper substrate (PET or TPE) layer and a second sensor loop printed on a second upper substrate (PET or TPE) layer.

Figure 9:
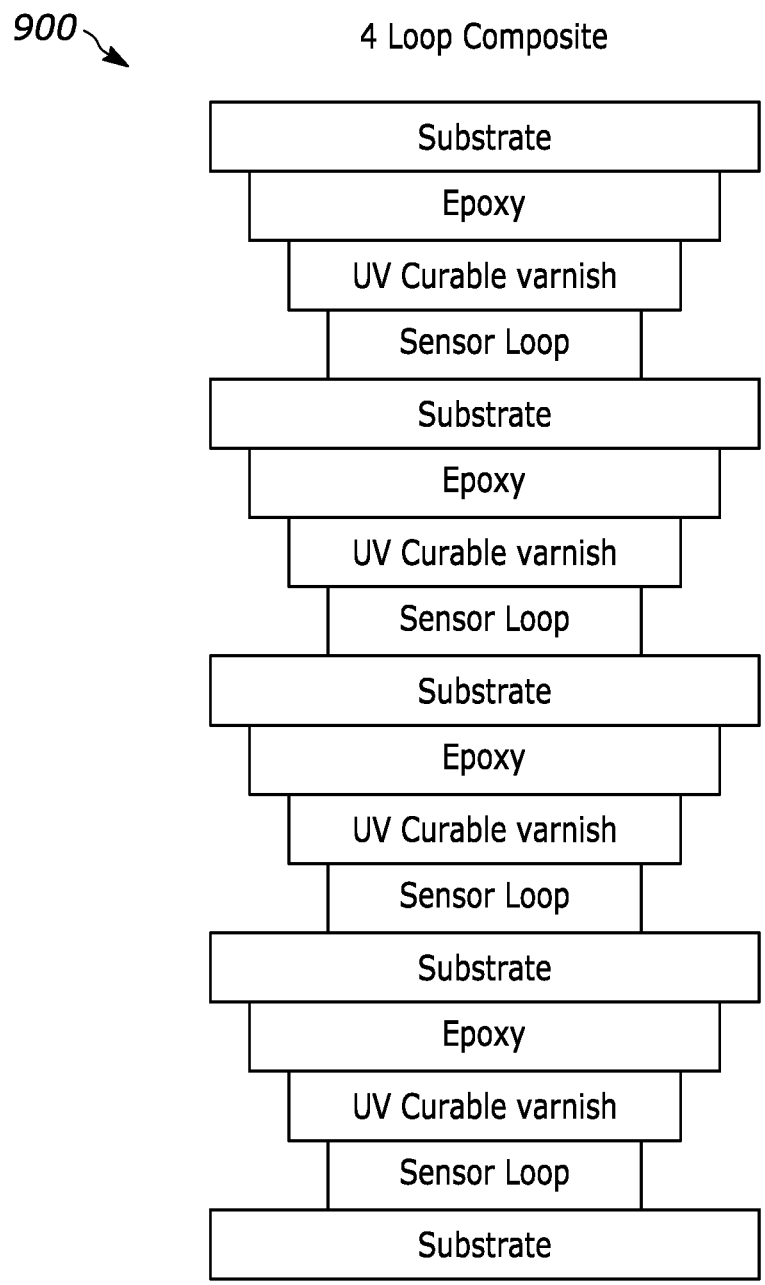
FIG. 9 is a diagram illustrating another loop stack 900, 110 for use as a printed belt antenna in the system 100 in accordance with one or more embodiments.

FIG. 9 is a diagram illustrating another loop stack 900, 110 for use as a printed antenna in the system 100 in accordance with one or more embodiments. The loop stack 900 is provided for illustrative purposes and it is appreciated that suitable variations are contemplated.

The stack 900 is a composite stack having 4 sensor loops/layers as shown. The sensor loops are formed on lower substrates in this example.

It is appreciated that other suitable composite stacks are contemplated.

Figure 10:
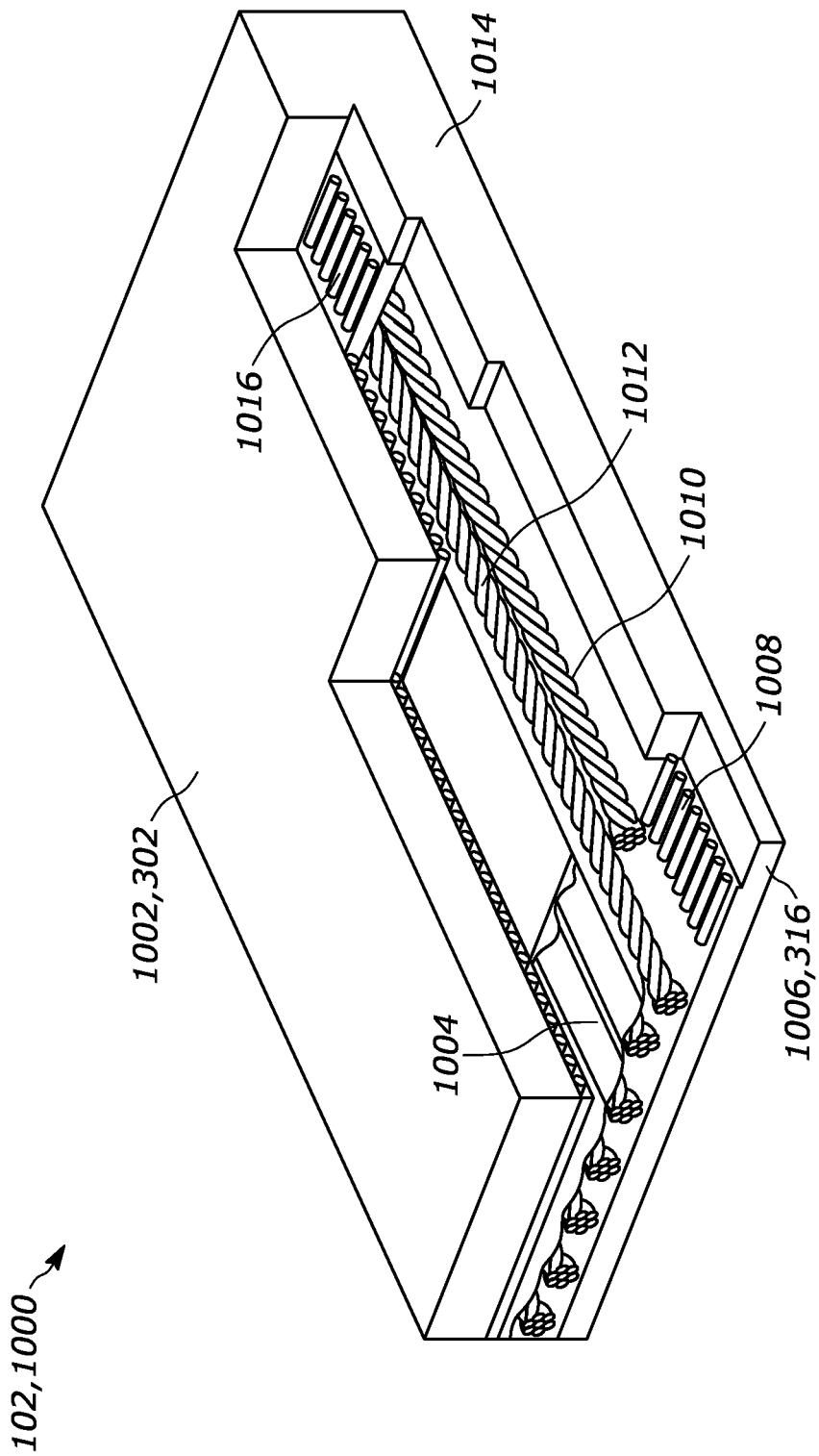
FIG. 10 is a diagram illustrating a conveyor belt 102,1000 having steel reinforcements and sensor loop stacks 1004 in accordance with one or more embodiments.

FIG. 10 is a diagram illustrating a conveyor belt 102,1000 having steel reinforcements and sensor loop stacks 1004 in accordance with one or more embodiments.

The belt 1000 includes a top cover layer 302, transverse reinforcements 1016, longitudinal steel reinforcements 1010,1012, second transverse reinforcements 1008, a second/lower (bottom) cover layer 1006,316 and edges 1014.

The sensor loop stack 1004 is over the steel cables 1010,1012 and below the cover layer 302 in this example. It is appreciated that the sensor loop stack 1004 can be inserted on and/or between the other layers.

Figure 11:
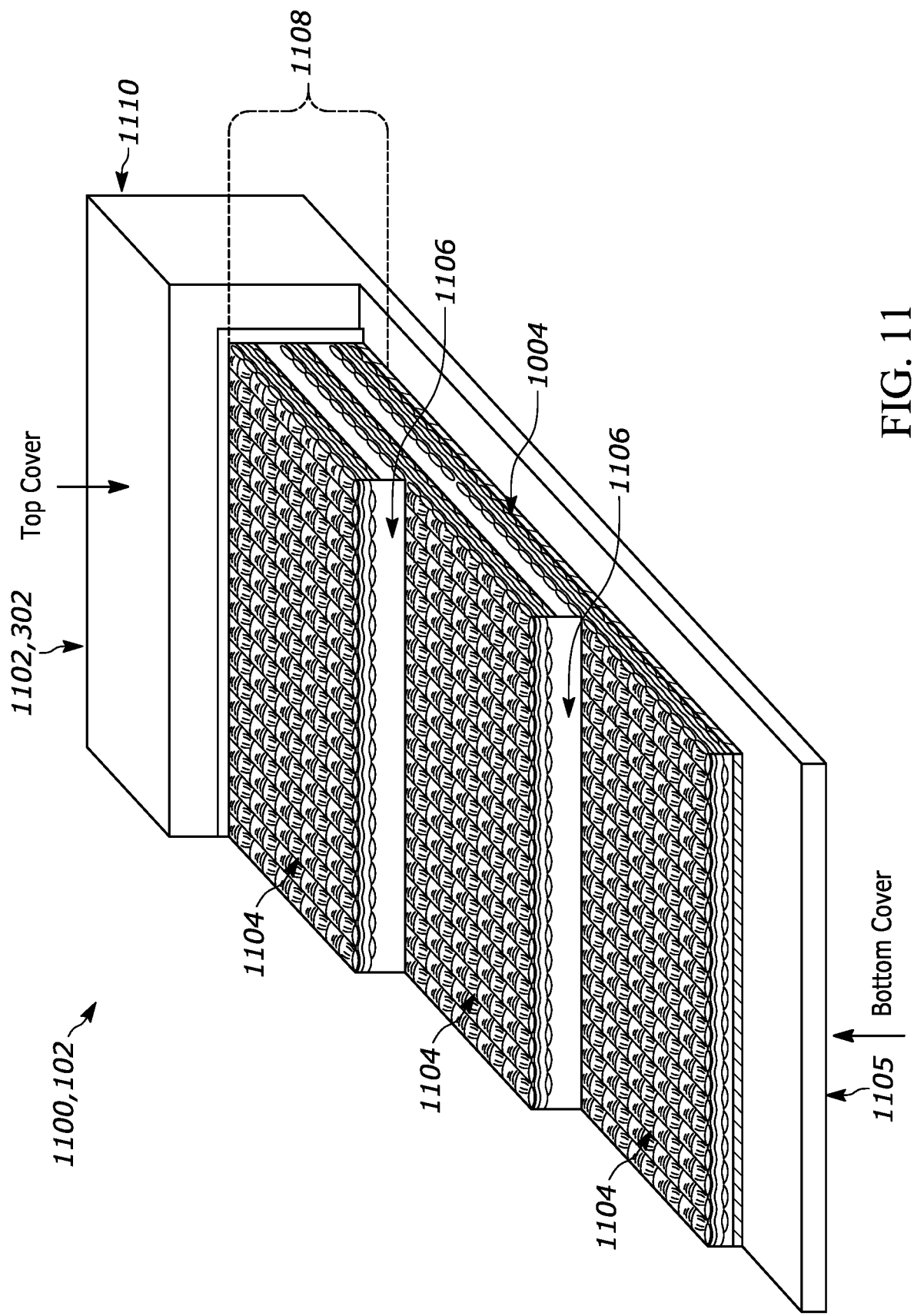
FIG. 11 is a diagram illustrating a conveyor belt 102,1100 having fabric reinforcements and sensor loop stacks 1004 in accordance with one or more embodiments.

FIG. 11 is a diagram illustrating a conveyor belt 102,1100 having fabric reinforcements and sensor loop stacks in accordance with one or more embodiments.

The belt 1100 includes a top cover layer 1102,302 and a stack 1108 of fabric reinforcement layers 1104 known as a "belt carcass" and adhesive layers 1106 and bottom cover layer 1105.

A sensor loop stack 1004 is inserted between the belt carcass 1108 and the bottom cover 1105 in one example. It is appreciated that the sensor loop stack 1004 can be inserted on and/or between the other layers.

Figure 12:
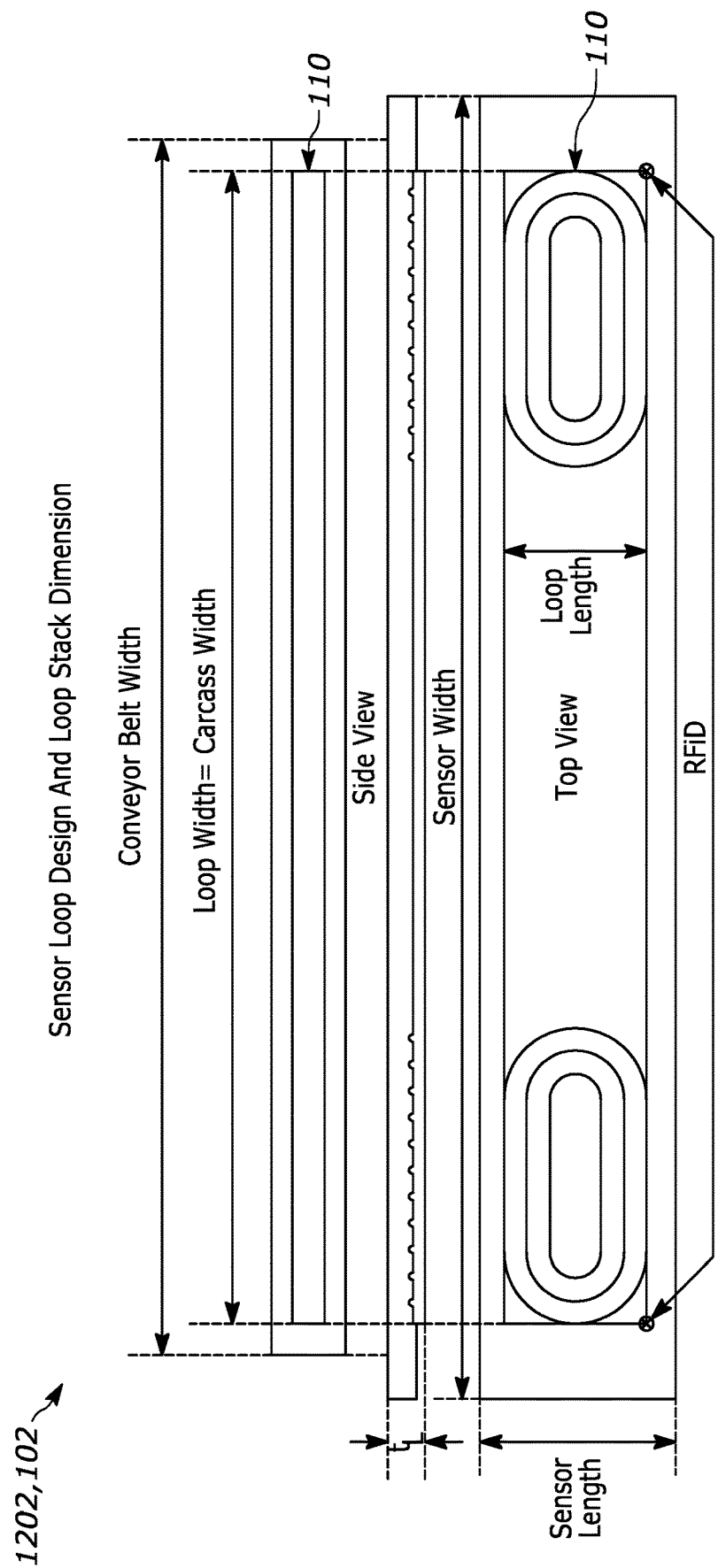
FIG. 12 is a diagram illustrating a side view and top view of a printed sensor loop stack 110 integrated into a conveyor belt 1202,102 in accordance with one or more embodiments.

FIG. 12 is a diagram illustrating a side view and top view of a printed sensor loop stack 110 integrated into a conveyor belt 1202,102 in accordance with one or more embodiments.

The belt 1202,102 has a conveyor belt width and a carcass width as shown in the side view.

The loop stack 110 has a width less than or equal to the carcass width.

Figure 13:
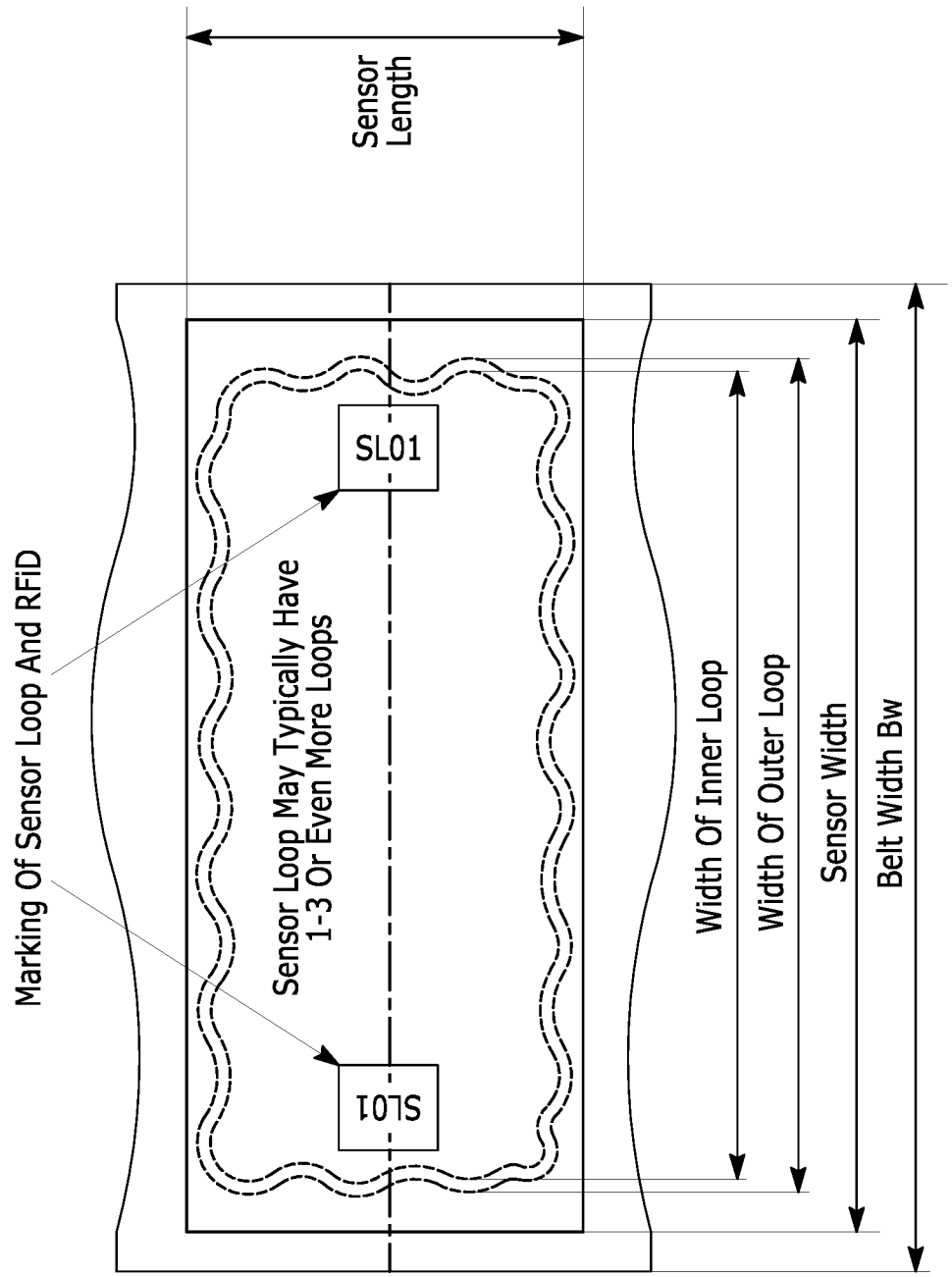
FIG. 13 is a diagram illustrating a top view of a printed loop stack 1410,110 having a rectangular shape in accordance with one or more embodiments.

FIG. 13 is a diagram illustrating a top view of a printed loop stack 1410,110 in accordance with one or more embodiments. This loop stack 1310 has rectangular shape and may have one or multiple concentric loops.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system for monitoring conveyor belts. The system also includes a sensor loop stack and radio frequency identification (RFID)s incorporated within a conveyor belt. The system also includes a transmitter configured to generate an electromagnetic field. The system also includes a detector configured to measure an induced electric field from the sensor loop stack. The system also includes a RFID reader. The system also includes. The system also includes circuitry configured to detect damage of the conveyor belt based on the measured induced electromagnetic field. Other embodiments of this aspect include corresponding computer systems, apparatus, and computer programs recorded on one or more computer storage devices, each configured to perform the actions of the methods.

Implementations may include one or more of the following features. The sensor loop stack may include a conductive ink printed on a substrate layer and arranged in a loop pattern to form a sensor loop or multiple sensor loops. The substrate layer may include of a transparent or partially transparent polymer. The system may include an upper substrate on the conductive ink and having one or more slots configured to mitigate void/bubble formation. The system may include a protective and adhesion layer formed on the conductive ink. The system may include a bonding layer configured to adhere the lower substrate to a cover layer. The system may include that the substrate layer has a thickness of about 10 to about 250 micrometers, the sensor loop has a thickness of about 100 nanometers to about 20 micrometers. The system may include a secondary sensor loop stack having a conductive ink printed on a substrate layer. The system may include one or more additional sensor loop stacks. The system the conductive ink includes silver. The sensor loop stack may include a plurality of partial stacks. The sensor loop stack is integrated between a cover layer and a belt carcass—longitudinal steel reinforcement cables or a stack of fabric reinforcement layers. The sensor loop stack is positioned adjacent transverse cable reinforcements. The system the sensor loop stack positioned adjacent a fabric reinforcement layer. The substrate may include a polyethylene terephthalate (pet) and the conveyor belt is a rubber belt. Implementations of the described techniques may include hardware, a method or process, or computer software on a computer-accessible medium.

As used herein, the term "circuitry" may refer to, be part of, or include an ApplicationSpecific Integrated Circuit (ASIC), an electronic circuit, a processor (shared, dedicated, or group (and/or memory) shared, dedicated, or group (that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring conveyor belts, the system comprising:
    a sensor loop stack and an identification tag incorporated within a conveyor belt;
    a transmitter configured to generate an electromagnetic field;
    a detector configured to measure an induced electric field from the sensor loop stack;
    a tag reader configured to read the identification tag;
    circuitry configured to detect damage of the conveyor belt based on the measured induced electromagnetic field and the read identification tag;
    a protective and adhesion layer formed on the conductive ink;
    a bonding layer configured to adhere the lower substrate to a cover layer; and
    substrate layer having a thickness of about 10 to about 250 micrometers, the sensor loop having a thickness of about 100 nanometers to about 20 micrometers.

2. The system of claim 1, the identification tag is a radio frequency identification tag (RFID).

3. The system of claim 1, the sensor loop stack positioned adjacent transverse cable reinforcements.

4. The system of claim 1, the sensor loop stack positioned adjacent a fabric reinforcement layer.

5. The system of claim 1, the substrate comprising a polyethylene terephthalate (PET) and the conveyor belt is a rubber belt.

6. A system for monitoring conveyor belts, the system comprising:
    a sensor loop stack and an identification tag incorporated within a conveyor belt;
    a transmitter configured to generate an electromagnetic field;
    a detector configured to measure an induced electric field from the sensor loop stack;
    a tag reader configured to read the tag;
    circuitry configured to detect damage of the conveyor belt based on the measured induced electromagnetic field and the read tag;
    a conductive ink printed on a substrate layer and arranged in a loop pattern to form a sensor loop or multiple sensor loops; and
    the substrate layer comprised of a transparent or partially transparent polymer.

7. The system of claim 6, further comprising an upper substrate on the conductive ink and having one or more slots configured to mitigate void/bubble formation.

8. The system of claim 6, further comprising a secondary sensor loop stack having a conductive ink printed on a substrate layer.

9. The system of claim 8, further comprising one or more additional sensor loop stacks.

10. The system of claim 6, the conductive ink includes silver.

11. The system of claim 6, the sensor loop stack comprising a plurality of partial stacks.

12. The system of claim 6, the sensor loop stack integrated between a cover layer and a belt carcass—longitudinal steel reinforcement cables or a stack of fabric reinforcement layers.

13. The system of claim 6, the sensor loop stack positioned adjacent transverse cable reinforcements.

14. The system of claim 6, the sensor loop stack positioned adjacent a fabric reinforcement layer.

15. The system of claim 6, the substrate comprising a polyethylene terephthalate (PET) and the conveyor belt is a rubber belt.

16. The system of claim 6, the substrate comprising a thermoplastic elastomer (TPE) and the conveyor belt is comprised of TPE.

17. The system of claim 6, the identification tag is a radio frequency identification tag (RFID).

\* \* \* \* \*